UNITED STATES PATENT OFFICE.

EMMA J. WOODRUFF, OF CHICAGO, ILLINOIS.

COMPOUND FOR PRESERVING FLOWERS, &c.

SPECIFICATION forming part of Letters Patent No. 307,157, dated October 28, 1884.

Application filed August 21, 1884. (No specimens.)

*To all whom it may concern:*

Be it known that I, EMMA J. WOODRUFF, a citizen of the United States, residing at Chicago, in the county of Cook and State of Illinois, have invented certain new and useful Improvements in Compounds for Preserving Flowers, &c., of which the following is a specification, to wit:

This invention relates to an improvement in compounds for preserving natural flowers, &c.; and it consists in a novel combination of ingredients, substantially as will be hereinafter more fully set forth and claimed.

In order that others skilled in the art to which my invention appertains may avail themselves of its benefits, I will now proceed to describe its formation and use.

My improved compound consists of the following ingredients, in about the proportions named, viz: two pounds wood-naphtha, two pounds true benzole, one-half pound acetic ether, one-half pound chloroform, one pound sandarac, one-half pound white dammar, one-half pound white wax, one-half ounce corrosive sublimate. In compounding these ingredients, I first mix well together all the liquids named, then add the other articles, and allow it to stand about twenty-four hours, or until thoroughly dissolved. After this the compound is well filtered, and is then ready for use, and will be found of value in the preservation or embalming of all natural flowers, shrubs, grasses, &c., which are simply dipped into the preparation till all parts are covered with it, and then removed and allowed to dry.

Having thus fully described my invention, what I claim as new, and desire to secure by Letters Patent—

The herein-described compound, consisting of wood-naphtha, true benzole, acetic ether, chloroform, sandarac, white dammar, white wax, and corrosive sublimate, combined in substantially the manner and proportions and for the purpose set forth.

In testimony whereof I affix my signature in presence of two witnesses.

EMMA J. WOODRUFF.

Witnesses:
   W. C. McARTHUR,
   CHAS. KRESSMANN.